United States Patent
Hindle et al.

(10) Patent No.: US 9,769,537 B2
(45) Date of Patent: Sep. 19, 2017

(54) SHARING VIDEO RECORDING RESOURCES OVER A NETWORK

(71) Applicant: TVWorks, LLC, Philadelphia, PA (US)

(72) Inventors: James Matthew Hindle, London (CA); Jeffrey Ronald Wannamaker, London (CA)

(73) Assignee: Comcast Cable Communications Management, LLC, Philadelphia, PA (US)

(*) Notice: Subject to any disclaimer, the term of this patent is extended or adjusted under 35 U.S.C. 154(b) by 0 days.

(21) Appl. No.: 14/755,577

(22) Filed: Jun. 30, 2015

(65) Prior Publication Data

US 2016/0094892 A1 Mar. 31, 2016

Related U.S. Application Data

(63) Continuation of application No. 12/035,856, filed on Feb. 22, 2008, now Pat. No. 9,106,798.

(51) Int. Cl.
| | |
|---|---|
| *H04N 21/6543* | (2011.01) |
| *H04N 5/782* | (2006.01) |
| *H04N 7/173* | (2011.01) |
| *H04N 21/258* | (2011.01) |
| *H04N 21/433* | (2011.01) |
| *H04N 21/458* | (2011.01) |

(Continued)

(52) U.S. Cl.
CPC ......... *H04N 21/6543* (2013.01); *H04N 5/781* (2013.01); *H04N 5/782* (2013.01); *H04N 7/173* (2013.01); *H04N 21/25808* (2013.01); *H04N 21/4334* (2013.01); *H04N 21/4583* (2013.01); *H04N 21/47214* (2013.01)

(58) Field of Classification Search
CPC ......... H04N 21/25808; H04N 21/4334; H04N 21/4583; H04N 21/47214
See application file for complete search history.

(56) References Cited

U.S. PATENT DOCUMENTS

| | | | |
|---|---|---|---|
| 7,080,400 B1 | 7/2006 | Navar | |
| 7,546,283 B2* | 6/2009 | Ota | ............... H04N 21/4147 |

(Continued)

FOREIGN PATENT DOCUMENTS

| | | |
|---|---|---|
| EP | 1768347 A1 | 3/2007 |
| WO | 2006055920 A2 | 5/2006 |
| WO | 2007148162 A1 | 12/2007 |

OTHER PUBLICATIONS

European Office Action—EP Appl. 09153371.1—dated Apr. 22, 2016.

(Continued)

*Primary Examiner* — Olugbenga Idowu
(74) *Attorney, Agent, or Firm* — Banner & Witcoff, Ltd.

(57) ABSTRACT

A method of sharing recording capability on a network, the network having a server supporting at least a recording DVR and a receiving DVR, the recording and receiving DVRs being in different households, the method comprising: (a) determining that the receiving DVR is unable to record the content at a certain time; and (b) identifying that the recording DVR is able to provide the receiving DVR with a recording of the content; (c) recording the content on the recording DVR at the certain time; and (d) transmitting the content from the recording DVR to the receiving DVR after the certain time.

17 Claims, 6 Drawing Sheets

(51) Int. Cl.
*H04N 21/472* (2011.01)
*H04N 5/781* (2006.01)

(56) References Cited

U.S. PATENT DOCUMENTS

| | | | |
|---|---|---|---|
| 7,765,235 B2 * | 7/2010 | Day | H04N 7/17318 386/241 |
| 2001/0024562 A1 * | 9/2001 | Nomura | G11B 27/002 386/279 |
| 2002/0078467 A1 | 6/2002 | Rosin et al. | |
| 2002/0162109 A1 * | 10/2002 | Shteyn | H04N 7/17336 725/87 |
| 2002/0184638 A1 * | 12/2002 | Agnihotri | G11B 27/36 725/89 |
| 2003/0009518 A1 * | 1/2003 | Harrow | H04L 47/10 709/203 |
| 2003/0023987 A1 * | 1/2003 | Hiramoto | H04N 21/47214 725/141 |
| 2005/0102698 A1 | 5/2005 | Bumgardner et al. | |
| 2005/0234864 A1 | 10/2005 | Shapiro | |
| 2006/0123246 A1 * | 6/2006 | Vantalon | H04N 5/913 713/189 |
| 2006/0133364 A1 | 6/2006 | Venkatsubra | |
| 2006/0230111 A1 | 10/2006 | Andersen et al. | |
| 2006/0248553 A1 | 11/2006 | Mikkelson et al. | |
| 2007/0039033 A1 | 2/2007 | Ota | |
| 2007/0079342 A1 * | 4/2007 | Ellis | H04N 5/913 725/89 |
| 2007/0277205 A1 * | 11/2007 | Grannan | H04N 7/17309 725/80 |
| 2008/0046954 A1 * | 2/2008 | Bhogal | H04N 7/163 725/134 |
| 2008/0133538 A1 | 6/2008 | Chavez et al. | |

OTHER PUBLICATIONS

European Search Report—EP 09153371.1—Jun. 16, 2009.
"Functional model of a Conditional Access system", EBU Review-Technical, European Broadcasting Union, Brussels, BE, No. 266, Dec. 21, 1994, pp. 64-77, XP000559450.
Canadian Office Action—CA 2,655,003—Feb. 17, 2015.
European Office Action—EP Appl. 09153371.1—dated Jul. 7, 2015.
Response to Canadian Office Action—CA Appl. 2,655,003—submitted Aug. 17, 2015.
First Examination Report for EP 09153371.1 dated Aug. 22, 2011.
CA, 2,655,003, Feb. 20, 2009, Sharing video recording resources over a network.
EP, 09153371.1, Feb. 20, 2009, Sharing video recording resources over a network.

* cited by examiner

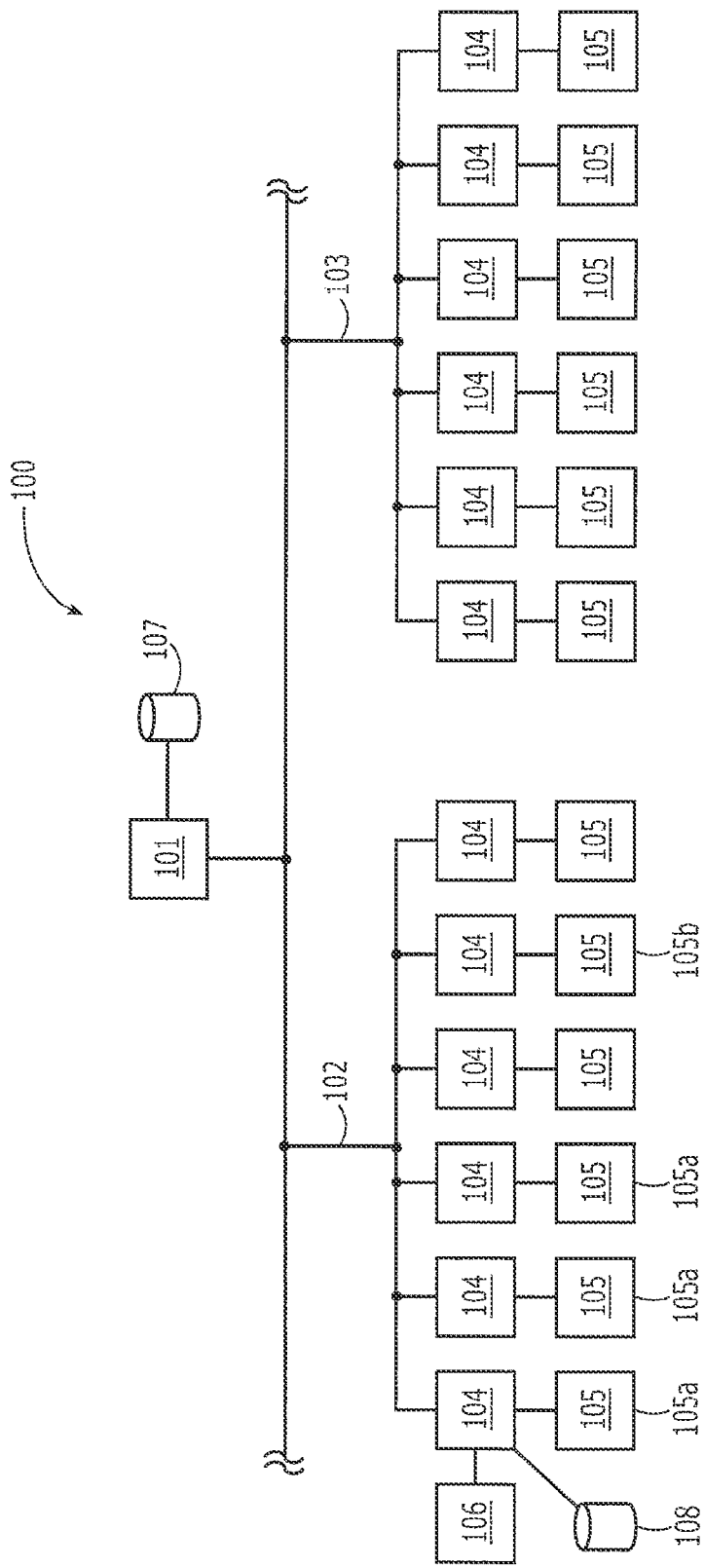

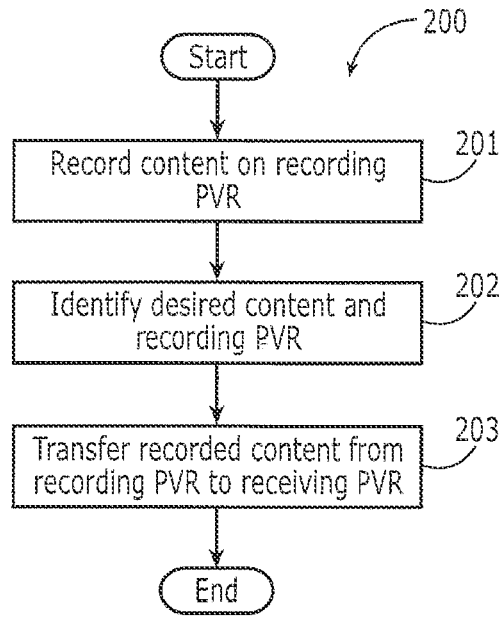
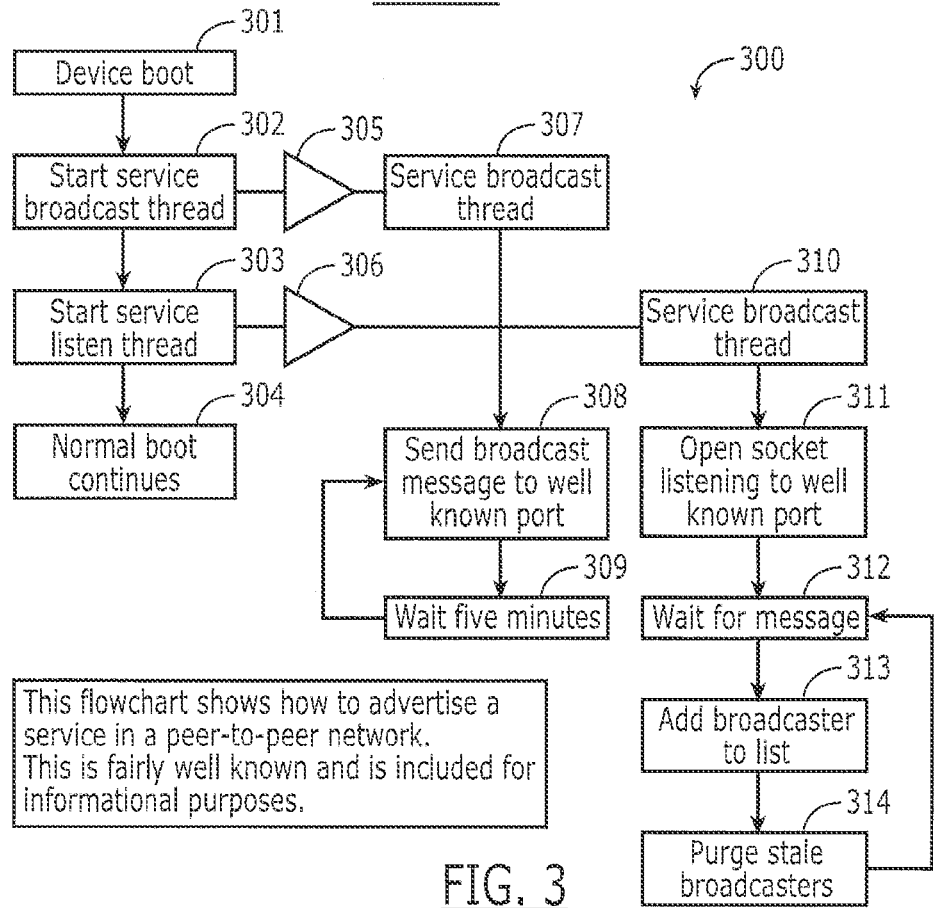

SHARING VIDEO RECORDING RESOURCES OVER A NETWORK

CROSS REFERENCE TO RELATED APPLICATIONS

This application is a continuation application of U.S. patent application Ser. No. 12/035,856, filed Feb. 22, 2008, the specification for which is hereby incorporated by reference in its entirety.

FIELD OF INVENTION

The present invention relates, generally, to a method and system for sharing distributed video recording resources on a network, and, more specifically, to a method and system for sharing distributed DVR resources and recorded content among different households.

BACKGROUND OF INVENTION

A digital video recorder (DVR) is a device or system that records video in a digital format to a digital storage medium such as a disk drive or solid state memory for future playback. DVRs have different configurations. For example, a DVR may be a stand-alone, modular unit (such as those sold by TiVo), it may be a portable personal device, or it may be incorporated into other audiovisual components such as a set-top box or the TV itself. It may even be software for a personal computer (PC) that enables the PC to capture video for playback using the digital storage medium of the PC.

DVRs have become very popular. One obvious reason for their popularity is the convenience they offer users in "time shifting" programs. Specifically, DVRs allow users to schedule recordings of broadcast programs for viewing at a later, more convenient, time for the user. Although a typical DVR system facilitates time shifting through recording, if the content is not available for recording, the system's value is obviously diminished.

As used herein, "unavailable content" refers to content that is not available for recording on a particular user's DVR. Content may be unavailable for recording for a variety of reasons. First, content may be unavailable because it is not distributed or is not otherwise publicly available from a cable service provider or other type of provider. For example, personal video or recordings from a private collection on one user's DVR are unavailable for recording or playback on the DVR of others. Likewise, certain content may be available only through certain subscriptions, and, thus, if a user does not have the needed subscription, that content is unavailable to that user. Content that is unavailable to a user because that user does not have access to it is referred to herein as "nonpublic" or "local" content.

Second, content may be unavailable because it has already been transmitted. That is, a DVR can only record programs that will be or are currently being transmitted. They are unable to record content that has already been broadcasted or otherwise transmitted. Nevertheless, users often realize that they wanted to record certain content after its broadcast. Content that is unavailable because it has already been transmitted is referred to herein as "previously-transmitted" content. Both nonpublic and previously-transmitted content are similar in that a particular user does not have access to the content.

The third category is slightly different, in that, the user may have access to the content, but hardware limitations of the user's DVR prevent him from recording it. For example, a given set-top box may have just two tuners, therefore only two programs at a given time can be recorded/viewed, rendering all other programs unavailable for recording. Additionally, DVRs are limited in their storage. Frequently a program will be unavailable simply because there is no room to store it on the DVR. Content that is unavailable for recording because of hardware limitations of the DVR is referred to herein as "hardware-restricted" content.

Therefore, content may be unavailable for recording because it is nonpublic, previously-transmitted, or hardware-restricted. Regardless of the reason, however, often there is a need or desire to make this otherwise unavailable content available for recording and/or playback. The present invention fulfills this need among others.

SUMMARY OF THE INVENTION

The present invention allows a user to obtain otherwise unavailable content by sharing DVR resources on a network. Specifically, Applicants recognize that unavailable content can be made available to users if the system that delivers content to DVRs also serves to link the DVRs together, thereby facilitating the sharing of hardware resources and the content they store. By enabling DVRs to transmit content upstream, rather than just receive information, previously-unavailable content, such as nonpublic or previously-transmitted content, is now available to users who desire it. This ability to transmit content from one DVR to another also enables users to exploit the DVR resources of other users to obtain otherwise hardware-restricted content. Therefore, in addition to making unavailable content available to users, the system and method of the present invention also more efficiently utilizes DVR resources.

One aspect of the invention is a system for facilitating sharing of DVR resources on a network. In a preferred embodiment, the system comprises (a) a server supporting two or more subnets; (b) a receiving DVR supported by the server, the receiving DVR configured to request unavailable content from a list of available DVRs served by the server, the available DVRs being in different households and potentially including a recording DVR; and (c) the recording DVR configured to transmit unavailable content to the receiving DVR after the recording of the unavailable content. In one embodiment, the list of available DVRs is maintained by the receiving DVR in a peer-to-peer environment, and, in another embodiment, the server maintains the list in a server-based environment. Preferably, the recording DVR and the receiving DVR are in a common subnet.

Another aspect of the invention is a method for sharing DVR resources on the system described above. In a preferred embodiment, the method comprises (a) recording content on the recording DVR; (b) identifying the content for transmission from a recording DVR to a receiving DVR; and (c) transmitting the recorded content to the receiving DVR. In one embodiment, identifying the content comprises determining that the receiving DVR is unable to record the content broadcast by the server at a certain time, and identifying the recording DVR as having the ability to provide the recorded content to the receiving DVR after the certain time.

BRIEF DESCRIPTION OF DRAWINGS

FIG. 1 is a schematic of a system of the present invention.
FIG. 2 depicts a flowchart of a basic embodiment of the method of the present invention.

FIG. 3 depicts a prior art protocol for providing a list of service providers.

DETAILED DESCRIPTION

Figure 4:
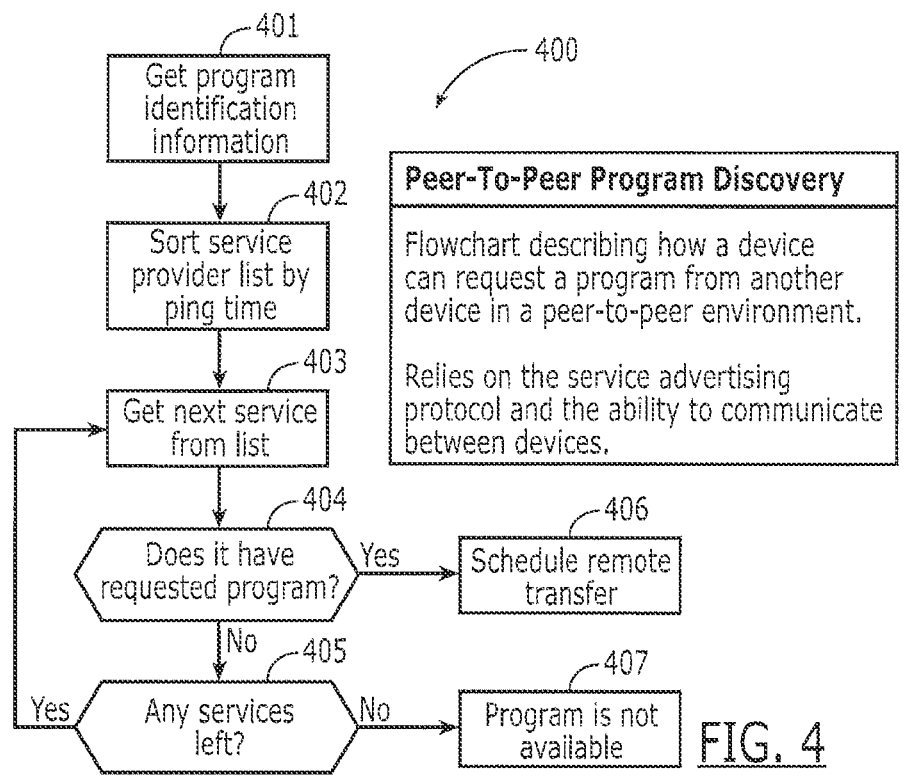
FIG. 4 shows a flowchart of peer-to-peer method of obtaining previously-transmitted content.

Referring to FIG. 1 a schematic diagram of the system 100 of the present invention is shown. Specifically, the system 100 comprises a server 101 which supports two or more subnets 102, 103. Each subnet comprises a plurality of different set-top boxes (STBs) 104, with at least a portion of the STBs being in different house holds. As used herein, a STB is a device that connects to a monitor 105 and an external source of signal (the server 101), converting the signal into content for display on the monitor. The signal source might be an ethernet cable, a satellite dish, a coaxial cable (cable television), a telephone line (including DSL connections), Broadband over Power Line, or even an ordinary VHF or UHF antenna. Content, in this context, could mean any or all of video, audio, Internet webpages, interactive games, or other possibilities.

The STB may have several different embodiments. For example, it may be a special digital STB for delivering digital content on TV sets that do not have a built in digital tuner. The STB may also descramble premium cable channels. A STB may be a cable converter box to receive digital cable TV channels and convert them to analog for non-digital TVs. In the case of direct broadcast satellite (mini-dish) systems such as SES Astra, Dish Network, or DirecTV, the STB is an integrated receiver/decoder (or IRD). In IPTV networks, the STB is a small computer providing two-way communications on an IP network, and decoding the video streaming media which eliminates the need for any coaxial cabling.

The STB may be a discrete unit or its functionality may be distributed to other components of the user's system such as the monitor, TV, DVR, or personal computer. For example, the STB may be a portable, modular unit (i.e., a personal STB) or it may be integrated into a stationary TV system. The STB may contain one or more digital processors or may use the processing capabilities of the other system components (e.g., TV, DVR, personal computer). Additionally, rather than having its own tuner, the STB may use the tuner of a television (or DVR).

Operatively connected to the STB 104 is a DVR 106. As mentioned above, DVRs have different configurations. For example, a DVR may be a stand-alone, modular unit (such as those sold by TiVo), it may be a portable, personal device, or it may be incorporated into other audiovisual components such as the STB 104 or the monitor 105. It may even be software for a personal computer (PC) that enables the PC to capture video for playback using the digital storage medium of the PC.

One subnet 102 includes at least one receiving DVR 105a supported by the server. To this end, the receiving DVR 105a is configured to request unavailable content from a list of available DVRs 105 served by the server. The available DVRs are in different households and may contain at least one recording DVR 105b configured to transmit unavailable content to the receiving DVR 105a after recording the unavailable content. Although the recording and receiving DVRs are in different households, preferably they are in a common subnet (e.g., subnet 102). The list of available DVRs may be maintained by the receiving DVR 104 in a peer-to-peer architecture (list 108), or the list may be maintained by the server in a server-based architecture (list 107). In a cable network, the server is usually part an MSO network headend.

Referring to FIG. 2, a flowchart 200 of a method of sharing recording resources on the system 100 is depicted. In step 201, the recording DVR records content. As described below, this content may be recorded in response to a request from the receiving DVR or prior to a request from the receiving DVR. This content is, however, unavailable for recording on the receiving DVR at that time of the receiving DVR's request. Either before or after step 201, this content is identified for transfer from the recording DVR 105 to the receiving DVR 104 in step 202. In step 203, the content is transmitted to the recording DVR. The transfer of the recording could occur soon after its recording, or it may be scheduled to occur during off hours. Furthermore, the transfer might use large TCP/IP bandwidth, or it might trickle using limited or access bandwidth. Once the content is transferred, the user of the receiving DVR is able to access it in the same manner as he would with any recording made locally.

There are two basic embodiments of this concept. The first is a "push" embodiment, in which one user offers to transmit digital content to one or more other DVRs on the network. For example, one user may push unavailable content to other users of a predefined group such as family and friends, business associates, club members, etc. The second is a "pull" embodiment, in which one user requests other DVRs on the cable network to transmit recorded content to it. In either embodiment, once the recorder and recipient of the content are identified, the content can be transmitted to the recipient either in a peer-to-peer or server-based environment.

Referring back to FIG. 2, the basic embodiment of the push concept will be considered. In step 201, the recording DVR records content either provided on the network or inputted by an auxiliary video/audio source 105 (see FIG. 1) such as home movie content from a video camera or from video tape/DVD. The system may be configured to check any copy protection information on the original source before allowing the storage of the content. Data described in the content may be provided by a user for display along with delivered content (e.g., title, rating, description, date, etc.). This data may be entered either by system default or through a user interface.

In step 202, this recorded content is identified for transfer to the receiving DVR from the recording DVR. In one embodiment, the user programs the recording DVR to make the content available for transfer to other DVRs. The recording DVR thereafter is configured to transfer the recorded content at some future time under the appropriate circumstances, for example, when requested by authorized family and friends. One way to implement this is for the recording DVR to assign a globally unique identifier (GUID) that comprises the set-top box IP or MAC address and an identifier (e.g. title) to the content. Access to the content may also be password protected. In this example, the receiving DVR would be configured to look for offered or "pushed" content which allows for the entry of the GUID and the optional password. Once the GUID is entered (and possibly the password), the two DVRs would schedule the transfer of content, for example, via an IP network, DOCSIS modem, or tricked over the RF network that connect the two systems. The MSO may use this as a feature to retain members of the same extended family as customers by allowing only users of the service to share DVR resources in this way.

The system and method of the present invention differ from prior art approaches to share DVR resources such as multi-room DVRs. By way of background, multi-room DVRs allow content that has been recorded by one DVR to be requested and played to a second set-top box in a customer household. This is done by allocating an RF channel that is blocked from exiting the household, but can be tuned by set-top boxes within the household. The DVR, where the content is recorded, streams the recorded data on to this allocated channel, and the set-top box that is receiving the content tunes to the allocated channel. Among other differences, in the present invention, the content can be shared among DVRs in different user households.

In addition to the content being offered to the receiving DVRs, the receiving DVRs may request the content. This is the pull concept. This concept includes two basic embodiments, one in which the recorded content already exists and the receiving DVR requests its transfer, and another in which the receiving DVR requests the recording DVR to record the content and then transfer it. Thus, in the first embodiment, step 202 is performed after step 201 and in the second embodiment, step 202 is performed before step 201. As described below, the first embodiment is useful to obtain nonpublic or previously-transmitted content, while the second is useful in obtaining hardware-restricted content.

Regarding the first embodiment, normally, a user would use an electronic program guide (EPG) to find a program that is currently being transmitted or is scheduled to be transmitted in the future, and to request that it be recorded. Conventionally, if the program showing time had already past, the content would not be available to the user. In the present invention, however, a user may request access to a program that has already been distributed, hoping that another DVR in the system, that is, the recording DVR, has already recorded it. Accordingly, in the first embodiment, in step 201, the recording DVR records content prior to the receiving DVR's request. Once recorded, the method proceeds to step 202 in which the receiving DVR requests content that has been previously-transmitted or is nonpublic and arranges its transfer with the recording DVR. This may be performed through an interface that allows the user to enter a program title, to select the program from a list of recent popular titles, or to browse into the past with the program guide. Still other ways of entering the desired program data will be obvious to one of skill in the art in light of this disclosure. The receiving DVR then determines if the title has been recorded by any DVR. This determination may be made, for example, by exchanging messages via TCP/IP. The messages may be strictly peer-to-peer (i.e., DVR to DVR) or they may be sent through a server. Preferably, the scope of the search is purposely limited by the topography of the subscriber network, or by some other factor, thereby limiting the messaging back and forth to reduce the time it takes to determine if a DVR on the network had recorded the desired content. To this end, the DVRs may be sorted according to ping time so that the closest DVRs are given priority. In step 203, the content is transferred, for example, via an IP network, over the DOCSIS modems, or tricked over the RF network that connects the two systems.

If the content is hardware-restricted, step 202 is performed prior to step 201. Specifically, the receiving DVR 104 determines that it is unable to record the content at a certain time, and the recording DVR is identified as having the ability to record the content and transmit it to the receiving DVR after the certain time. Next, the program is recorded by the recording DVR in step 201. After the program is recorded, in step 201 on the recording DVR, the recording DVR transmits the recorded program to the receiving DVR in step 203, as described above. In one embodiment, the user of the recording DVR may not even be aware that his DVR is being utilized in this way. In such an embodiment, the user would not have access to the recorded content, nor would he know the identity of the user of the receiving DVR.

As discussed above, the method of the present invention may be implemented to share content which would be otherwise unavailable by virtue of the content being non-public, previously-transmitted or hardware-restricted. Furthermore, the method may be implemented in a peer-to-peer or server-based environment. These permutations are described below in detail with respect to FIGS. 4-10.

Figure 10:
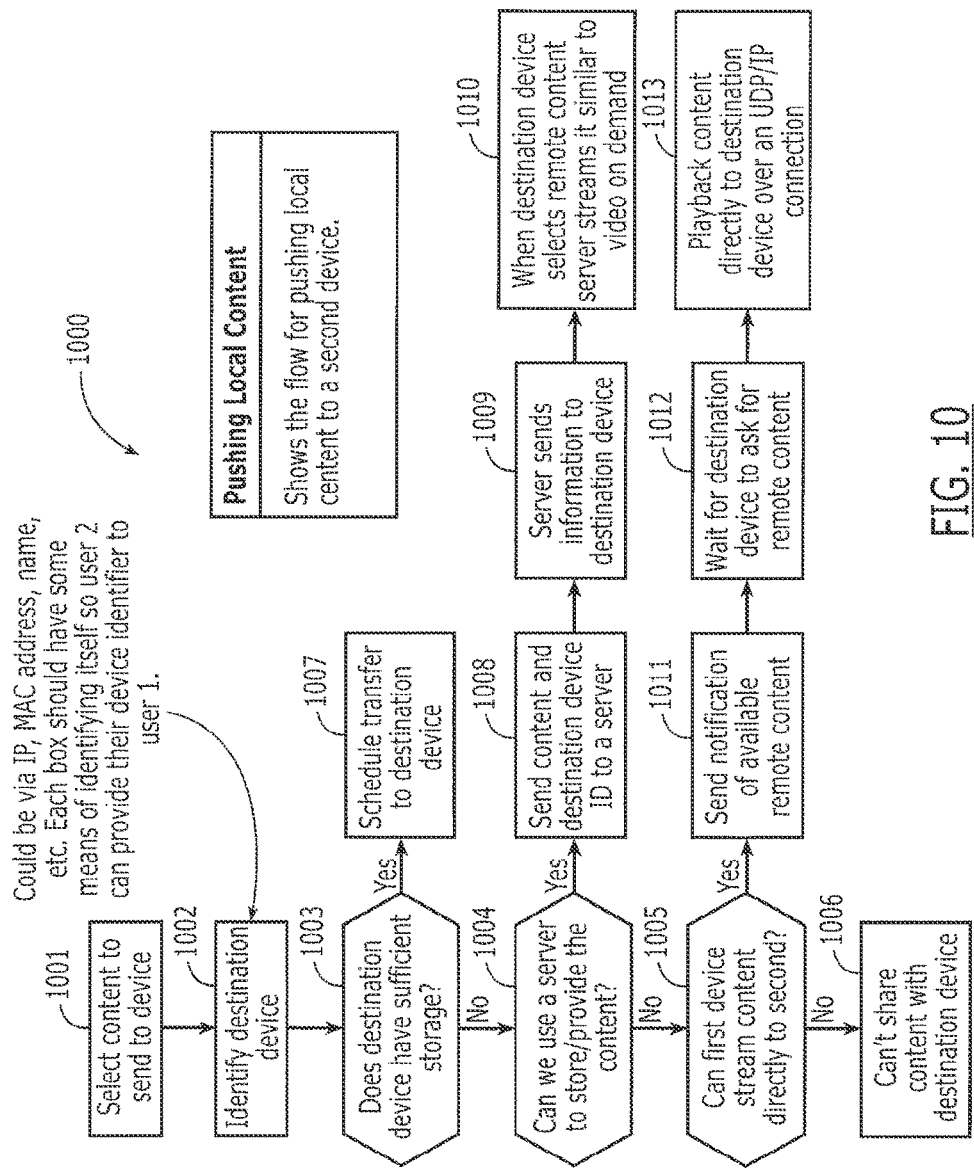
FIG. 10 shows a flowchart of pushing local content.

Referring to FIG. 10, a flowchart 1000 is shown of a preferred method for pushing local (or nonpublic) content to a receiving DVR for either a peer-to-peer or server-based environment. In step 1001, a user selects the content to be transmitted to one or more receiving DVRs. In step 1002, the receiving DVRs are identified. This could be done via an IP or MAC address, name, etc. Preferably, each receiving DVR has some simple means of identifying itself so one DVR can provide its device identifier to another DVR.

Once the receiving DVRs are identified, the process proceeds to step 1003 where a determination is made whether the receiving DVR (or destination device as indicated in the figure) have sufficient storage. If yes, the process proceeds to step 1007 where a transfer of the content is scheduled to the receiving DVR. If not, the process proceeds to step 1004 where a determination is made whether a server is able to store and provide the content to the receiving DVRs. If yes, the process proceeds to step 1008 where the content and the receiving DVR identification is sent to the server. In step 1009, the server then sends this information to the receiving DVR. Finally, in step 1010 when the receiving DVR selects or otherwise chooses to receive the remote content, the server streams the content to the receiving DVR using techniques and procedures similar to those used in Video On Demand (VOD).

Referring back to step 1004, if a determination is made that a server is not available, the process proceeds to step 1005 where a determination is made whether the recording device (i.e., the first device) is able to stream content directly to the second device (i.e., the receiving DVR). If yes, the process proceeds to step 1011 where a notification of available remote content is sent to the receiving DVR. In step 1012, the recording device awaits authorization or a request from the receiving DVR for the content. Once an authorization or request is received, the process proceeds to step 1013 where content is sent directly to a receiving DVR over a UDP/IP connection. Again, this is a well known data transfer technique.

Referring back to step 1005, if the recording device is unable to stream directly to the receiving device, the process proceeds to step 1006 where a determination is made that it cannot share the local content with a receiving DVR.

FIG. 4 shows a flowchart 400 describing how a DVR can request previously-transmitted content from another DVR in a peer-to-peer environment. (It should be understood that, in this flowchart and others in this application, the term "service" is used. This term is intended to be synonymous with recording DVR, and reflects that concept that the recording DVR is actually providing a service, that is, a recording service, to the receiving DVR.) In step 401, the receiving DVR identifies a program for recording. Once identifying information is entered into the system, the receiving DVR sorts a list of DVRs which are available for providing the requested program in step 402. The list of DVRs may be determined using known service advertising protocol such as the method depicted in FIG. 3.

Referring to FIG. 3, a flowchart 300 is shown for a protocol to advertise services in a peer-to-peer network. This is a fairly well known method and is included herein for informational purposes. In step 301, the device is booted up and starts a background thread in step 302, which periodically broadcasts indicating that it is available for use. Meanwhile, in step 303, the device starts another background thread that looks for other available devices by monitoring broadcast messages. The normal boot up procedure continues in step 304.

After this service broadcast is started in step 302, a new background process is started in step 307, in which the broadcast message is sent to a well know port in step 308. In step 309, the process waits for a period of time, for example, five minutes, before returning to step 308 in which again a broadcast message is sent to the well known port.

After the listening thread is started in step 303, a new background process is started in step 310, in which a socket is opened to listen to a well known port in step 311. In step 312, the device waits for a message and, in step 313, a broadcaster is added to the list. The device purges the stale broadcasts in step 314 and returns to step 312 in which it continues to wait for messages from other devices. As mentioned above, such an algorithm is known, and is used for example, in Napster.

Referring back to FIG. 4, once a list of service providing devices, in this case available DVRs, is obtained, the method prioritizes the available DVRs in step 402. As mentioned above, a preferred way to do this is according to ping time so that DVRs with faster round trip communication times are given priority. In step 403, the receiving DVR retrieves the next available DVR from the list. A decision is made in step 404 as to whether the available DVR has the requested program. If the requested program is available on the next available DVR, the user will receive a confirmation message. If not, the method continues to step 405 in which a determination is made whether other available DVRs on the list exist. If so, the method returns to step 403 in which the method is reiterated for the next available DVR. If there are no more available DVRs, the content is identified as not being available in step 407.

Referring back to step 404, if the DVR does have the requested program, it is considered a recording DVR, and the method continues to step 406 in which the transfer of the program is scheduled from the recording DVR to the receiving DVR.

Figure 8:
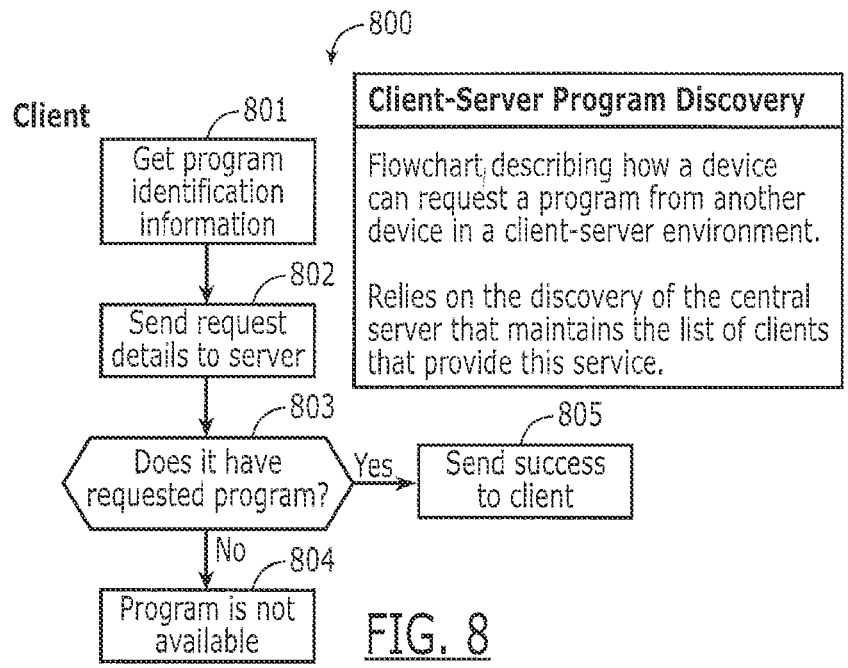
FIG. 8 shows a flowchart of a server-based method of obtaining previously-transmitted content from the recording DVR side.
Figure 9:
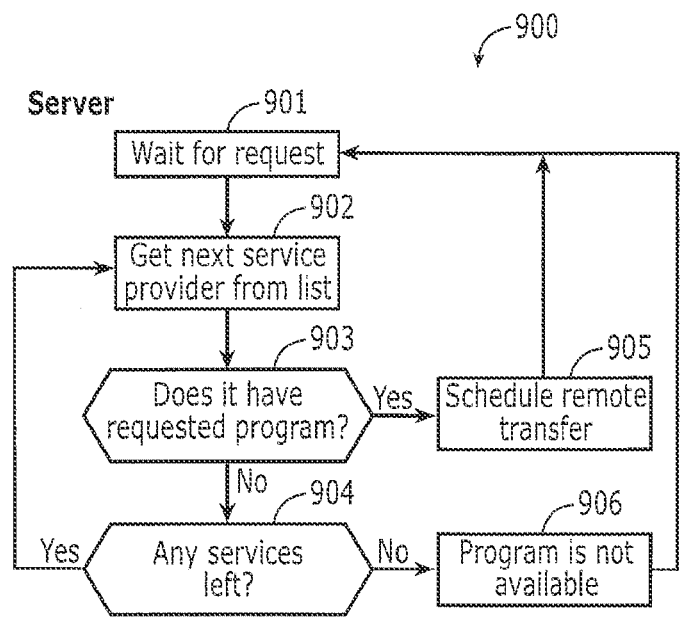
FIG. 9 shows the method of FIG. 8 from the server side.

Referring to FIGS. 8 and 9, flowcharts 800, 900 are provided that describe how a DVR can request previously-transmitted content from another DVR in a server-based environment. FIG. 8 depicts the method from the client perspective and FIG. 9 depicts the method from the server perspective. As opposed to the peer-to-peer method described above with respect to FIG. 4, this method relies on a central server to maintain a list of DVRs that are available to share their resources. The list of DVRs may be generated as described above, however, step 308 would change to be a direct message to the central server rather than a broadcast, and steps 303, 306, and 310-314 are unnecessary.

In step 801, the receiving DVR provides the program identification information. Next, in step 802, the receiving DVR sends this information in the form of a request to the server, and a determination is made in step 803 whether available DVRs have the requested program. If not, the method proceeds to step 804 in which the content is determined to be not available. However, if an available DVR, specifically, a recording DVR, is determined to have the requested content in step 803, the method proceeds to step 805 to schedule remote transfer of the program from the recording DVR to the receiving DVR.

FIG. 9 considers the method of FIG. 8 from the server side. The server waits for a request in step 901. Once a request is received, the method proceeds to 902 in which the server obtains the next available DVR from a list of available DVRs. In step 903, a determination is made whether the client from the list has the requested program. If not, the method proceeds to step 904, in which a determination is made whether any available DVRs remain on the list. If yes, the method proceeds to step 902 in which the method continues as described above. If not, the method proceeds to step 906 in which the requested content is determined to be not available and the method returns to 901.

Referring back to step 903, if the requested program is available on a recording DVR, the method proceeds to step 905 in which a remote transfer is scheduled. After that, the method returns to step 901.

Figure 5:
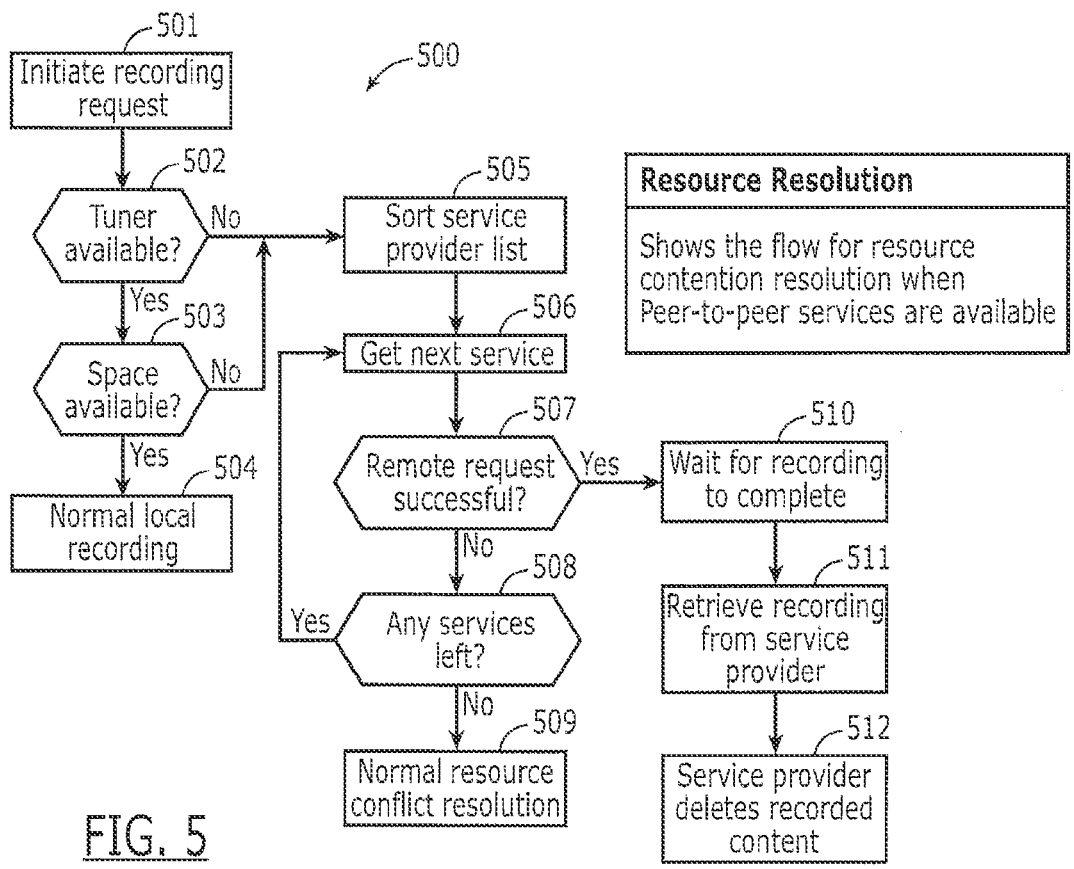
FIG. 5 shows a flowchart of peer-to-peer method of obtaining hardware-restricted content.

Referring to FIG. 5 a flowchart 500 is shown for sharing DVR resources in a peer-to-peer environment to obtain hardware-restricted content. In step 501, a recording request is initiated by a receiving DVR. In 502, a determination is made whether the tuner of the receiving DVR is available at a certain time (i.e., it not already scheduled to tune into a channel at that time). If it is, the method advances to step 503 in which a determination is made whether sufficient digital storage space is available to record the requested content. If space is available, then the method continues to step 504 in which a normal local recording is made.

If either the tuner is not available or the digital storage space is not available as determined in steps 502 and 503, respectively, the method continues to step 505 in which a list of DVRs (or recording services) available for sharing is sorted. This list may be generated in accordance with the method of FIG. 3 mentioned above. Furthermore, as mentioned above, preferably the list is prioritized by ping time or other methods for minimizing the distance between the recording and receiving DVRs in order to optimize the process time. In step 506, the receiving DVR connects to the first DVR (or recording service) on the list and, in step 507, a determination is made whether that DVR can handle the desired recording. If not, the method continues to step 508 in which a determination is made whether other available DVRs exist. If so, the method proceeds to step 506 in which it is reiterated, as described above. If there are no other available DVRs to perform the desired recording, then in step 509, the method proceeds to normal resource conflict resolution, for example if there initially no space available on the local DVR, the local DVR queries the user to delete previously recorded content to make room for the desired content.

Returning to step 507, if a remote request is successful, the method continues to step 510 in which the receiving DVR waits until the recording is complete. At some point after the recording is complete, the recorded content is retrieved from the service provider, that is, the recording DVR, in step 511. Finally, in step 512, the service provider recording DVR deletes the recorded content.

Figure 6:
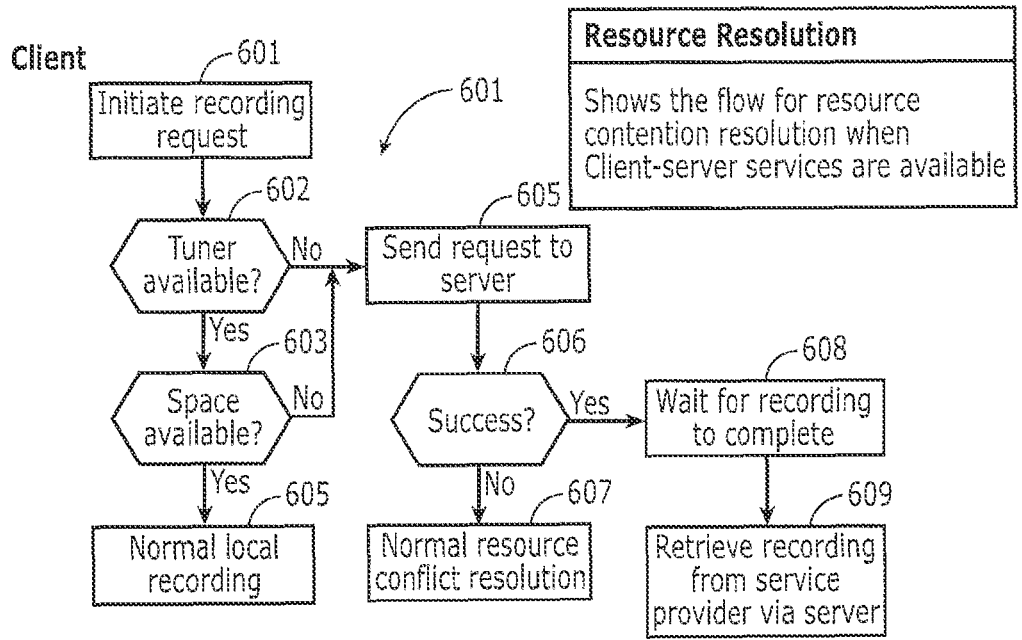
FIG. 6 shows a flowchart of a server-based method of obtaining hardware-restricted content from the recording DVR side.
Figure 7:
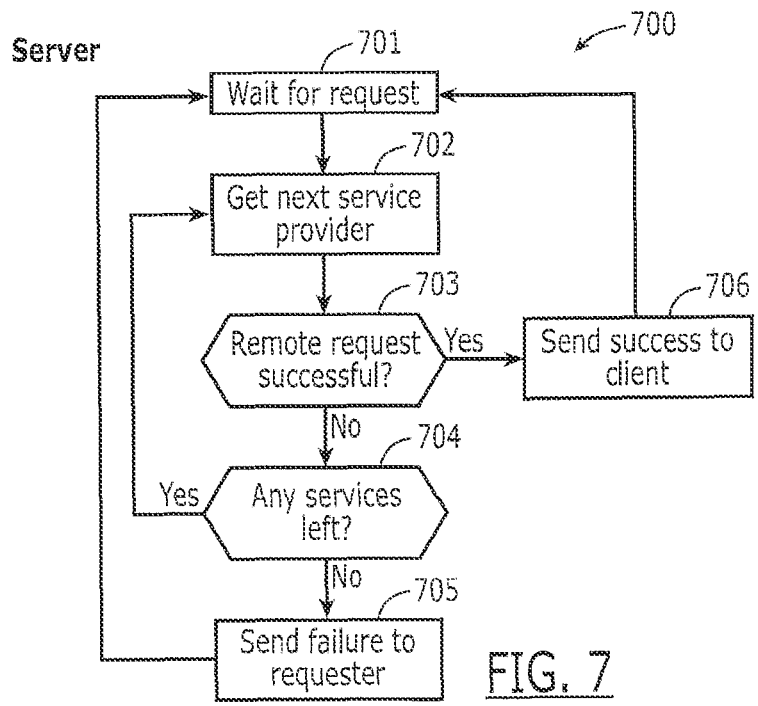
FIG. 7 shows the method of FIG. 6 from the server side.

Referring to FIGS. 6 and 7, flowcharts 600, 700 are shown for sharing DVR resources in a server-based environment for obtaining resource-restricted content. FIG. 6 shows the method from the client's side, and FIG. 7 shows the method from the server side. Steps 601 through 604 are essentially the same as steps 501-504 above. Specifically, in step 601, a request to have a program recorded is initiated by the DVR. A determination is made in step 602 whether the tuner is available. If yes, the method continues to step 603 in which a determination is made whether digital storage space is available. If yes, the method proceeds to step 604 in which normal local recording is activated.

If, however, there is no tuner or space available as determined in step 602 and 603, the method proceeds to step 605 in which the receiving DVR sends a request to the server for remote recording of the program. A determination is made in step 606 whether the request can be met by a remote DVR. If not, the method returns to 607 in which normal resource conflict resolution is undertaken. Normal conflict resolution involves the display of a user interface which allows the cancellation of a conflicting scheduled recording to make a tuner available, or the deletion of existing recorded content to make space available on the storage device.

If, however, the request is successful as determined in step 606, the method continues to step 608, in which the client waits until the recording is complete. After the recording is complete, the method proceeds to step 609, in which the recording is retrieved from the recording DVR via the server and downloaded to the client.

Referring to FIG. 7, the method described above is considered from the server side. In step 701, the server waits for a request from a receiving DVR. Once a request is received, the server obtains the next available DVR from a list of available DVRs in step 702. A determination is made in step 703 whether the next available DVR is able to accommodate the request. If not, the method continues to step 704 in which a determination is made if there are other available DVRs. If so, the method returns to step 702 and repeats itself. If, however, there are no more available DVRs, the method proceeds to step 705 in which a failure notice is sent to the requestor.

If an available DVR is able to accommodate the request in step 703, then the method proceeds to step 706 in which recorded content is sent to the receiving DVR and the method returns to step 701.

What is claimed is:

1. A method comprising:
    determining, by a computing device, whether a destination computing device has sufficient space to store a first content item;
    in response to determining that the destination computing device does not have sufficient storage space to store the first content item, determining whether a server can store the first content item, the server being a separate device from the destination computing device;
    in response to determining that the server cannot store the first content item, determining whether a sending computing device can stream the first content item to the destination computing device at a current point in time;
    in response to determining that the sending computing device can stream the first content item to the destination computing device, recording, by the sending computing device, the first content item, and sending to the destination computing device a notification of availability of the first content item; and
    preventing a user of the sending computing device from accessing identity information of a user of the destination computing device.

2. The method of claim 1, further comprising:
    deleting the first content item from the sending computing device in response to the first content item being sent to the destination computing device.

3. The method of claim 1, further comprising:
    recording, by the sending computing device, the first content item; and
    assigning, by the sending computing device and to the first content item, an identifier comprising a media access control address and a title of the first content item.

4. The method of claim 1, further comprising:
    in response to determining that the destination computing device does not have sufficient storage space to store a second content item, determining whether the server can store the second content item; and
    in response to determining that the server can store the second content item,
        receiving an identification of the destination computing device; and
        streaming, from the server to the destination computing device, the second content item.

5. The method of claim 1, further comprising:
    pinging a plurality of sending computing devices comprising the sending computing device;
    sorting a list of the plurality of sending computing devices based on a ping time of each sending computing device; and
    selecting the sending computing device based on the sending computing device having a lowest ping time of the plurality of sending computing devices.

6. The method of claim 1, further comprising:
    recording, by the sending computing device, the first content item; and
    preventing a user of the sending computing device from accessing the first content item.

7. The method of claim 1, further comprising:
    in response to determining that the destination computing device does not have sufficient storage space to store a second content item, determining whether the server can store the second content item;
    in response to determining that the server cannot store the second content item, determining whether the sending computing device can stream the second content item to the destination computing device;
    in response to determining that the sending computing device cannot stream the second content item to the destination computing device, determining whether a different sending device can stream the second content item to the destination computing device; and
    in response to determining that the different sending device cannot stream the second content item to the destination computing device, deleting a recording of a third content item stored on the destination computing device to make space available on the destination computing device to store the second content item.

8. A method comprising:
    determining, by a computing device, whether a destination computing device has sufficient space to store a first content item;

in response to determining that the destination computing device does not have sufficient storage space to store the first content item, determining whether a server can store the first content item, the server being a separate device than the destination computing device;
in response to determining that the server cannot store the first content item,
  sorting a list of a plurality of sending computing devices based on a ping time of each sending computing device;
  selecting a first sending computing device, of the plurality of sending computing devices, based on ping times of the plurality of sending computing devices;
  determining whether the first sending computing device, of the plurality of sending computing devices, can stream the first content item to the destination computing device;
  in response to determining that the first sending computing device cannot stream the first content item to the destination computing device, selecting a second sending computing device of the plurality of sending computing devices based on the ping times and determining whether the second sending computing device can stream the first content item to the destination computing device; and
  in response to determining that the first sending computing device cannot stream the first content item to the destination computing device and that the second sending computing device can stream the first content item to the destination computing device,
    recording the first content item by the second sending computing device, and
    preventing a user of the second sending computing device from accessing identity information of a user of the destination computing device.

9. The method of claim 8, further comprising:
deleting the first content item from one of the first sending computing device or the second sending computing device after the one of the first sending computing device or the second sending computing device has sent the first content item to the destination computing device.

10. The method of claim 9, further comprising:
receiving, from the destination computing device, a request to stream the first content item; and
streaming, from the second sending computing device to the destination computing device, the first content item.

11. The method of claim 9, further comprising:
in response to determining that each of the plurality of sending computing devices cannot stream a second content item to the destination computing device, deleting a recording of a third content item stored on the destination computing device to make space available on the destination computing device to store the second content item.

12. The method of claim 9, further comprising:
assigning, by the second sending computing device to the first content item, an identifier comprising a media access control address and a title of the first content item.

13. A method comprising:
in response to determining that a destination computing device and a server do not have sufficient storage space to store a first content item, determining whether a sending computing device can stream the first content item to the destination computing device the server being a separate device from the destination computing device;
in response to determining that the sending computing device can stream the first content item to the destination computing device, recording, by the sending computing device, the first content item, and sending to the destination computing device a notification of availability of the first content item;
in response to receiving, from the destination computing device, a request to stream the first content item, streaming, from the sending computing device to the destination computing device, the first content item; and
preventing a user of the sending computing device from accessing identity information of a user of the destination computing device.

14. The method of claim 13, further comprising:
pinging a plurality of sending computing devices comprising the sending computing device;
sorting a list of the plurality of sending computing devices based on a ping time of each sending computing device; and
selecting the sending computing device based on the sending computing device having a lowest ping time of the plurality of sending computing devices.

15. The method of claim 13, further comprising:
deleting the first content item from the sending computing device after the first content item is sent to the destination computing device.

16. The method of claim 13, further comprising:
preventing a user of the sending computing device from accessing the first content item.

17. The method of claim 13, further comprising:
in response to determining that the destination computing device does not have sufficient storage space to store a second content item, determining whether the server can store the second content item;
in response to determining that the server cannot store the second content item, determining whether the sending computing device can stream the second content item to the destination computing device;
in response to determining that the sending computing device cannot stream the second content item to the destination computing device, determining whether a different sending device can stream the second content item to the destination computing device; and
in response to determining that the different sending device cannot stream the second content item to the destination computing device, deleting a recording of a third content item stored on the destination computing device to make space available on the destination computing device to store the second content item.

* * * * *

UNITED STATES PATENT AND TRADEMARK OFFICE
CERTIFICATE OF CORRECTION

PATENT NO. : 9,769,537 B2
APPLICATION NO. : 14/755577
DATED : September 19, 2017
INVENTOR(S) : Hindle et al.

Page 1 of 1

It is certified that error appears in the above-identified patent and that said Letters Patent is hereby corrected as shown below:

In the Drawings

Drawing Sheet 4 of 6, Figure 6, "Normal local recording", Reference Numeral 605:
Please delete "605" and insert --604--.

Drawing Sheet 6 of 6, Figure 10, "Pushing Local Content" Box, Line 2:
Delete "centent" and insert --content--.

In the Claims

Column 12, Claim 13, Line 6:
After "device", insert --,--.

Signed and Sealed this
Twenty-first Day of August, 2018

Andrei Iancu
*Director of the United States Patent and Trademark Office*